(12) United States Patent
Li et al.

(10) Patent No.: US 12,282,126 B2
(45) Date of Patent: Apr. 22, 2025

(54) DEVICE OF DETECTING RAY DOSE ADAPTABLE FOR COUPLING WITH TERMINAL AND METHOD OF DETECTING RAY DOSE

(71) Applicant: NUCTECH COMPANY LIMITED, Beijing (CN)

(72) Inventors: Jianmin Li, Beijing (CN); Guoping Zhu, Beijing (CN); Ming Ruan, Beijing (CN); Kun Zhao, Beijing (CN); Yanli Deng, Beijing (CN); Junli Li, Beijing (CN); Qitian Miao, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 195 days.

(21) Appl. No.: 18/146,101

(22) Filed: Dec. 23, 2022

(65) Prior Publication Data

US 2023/0213666 A1    Jul. 6, 2023

(30) Foreign Application Priority Data

Dec. 30, 2021   (CN) .......................... 202111680495.3

(51) Int. Cl.
*G01T 1/20*    (2006.01)
(52) U.S. Cl.
CPC .......... *G01T 1/2002* (2013.01); *G01T 1/2006* (2013.01)
(58) Field of Classification Search
CPC ..... G01T 1/2002; G01T 1/2006; G01T 1/023; G01T 7/00
See application file for complete search history.

(56) References Cited

U.S. PATENT DOCUMENTS

| 8,735,842 B2 | 5/2014 | Tsai et al. |
| 2012/0292518 A1 | 11/2012 | Goldstein |

(Continued)

FOREIGN PATENT DOCUMENTS

| CN | 204154904 U | 2/2015 |
| CN | 108415061 A | 8/2018 |

(Continued)

OTHER PUBLICATIONS

Extended European Search Report mailed Aug. 3, 2023 in European Application No. 22216540.9, 11 pages.

(Continued)

*Primary Examiner* — Kiho Kim
(74) *Attorney, Agent, or Firm* — Knobbe, Martens, Olson & Bear, LLP

(57) ABSTRACT

Provided is a device of detecting a ray dose adaptable for coupling with a terminal, including: a housing, a scintillator and a light shielding layer. The housing has an accommodating space and a window, the accommodating space is in communication with the window; the scintillator is configured to receive a ray and convert a received ray into a visible light, the scintillator is located in the accommodating space, the scintillator covers the window, an outer surface of the scintillator includes a first outer surface and a second outer surface, and the first outer surface is adapted to a camera of the terminal; and the light shielding layer is configured to shield a visible light in an external environment from illuminating on the scintillator, the light shielding layer is arranged on the second outer surface of the scintillator.

11 Claims, 4 Drawing Sheets

(56) References Cited

U.S. PATENT DOCUMENTS

2016/0209527 A1    7/2016  Woo
2018/0164444 A1*   6/2018  Kakiuchi .............. G01T 1/2006

FOREIGN PATENT DOCUMENTS

| | | |
|---|---|---|
| CN | 114185076 A | 3/2022 |
| CN | 216696693 U | 6/2022 |
| JP | H05-297145 | 11/1993 |
| JP | H07-174855 A | 7/1995 |
| JP | 2002-357692 A | 12/2002 |
| JP | 2012-233892 A | 11/2012 |
| JP | 2013-072682 A | 4/2013 |
| JP | 2013-145186 A | 7/2013 |
| JP | 2016-532850 A | 10/2016 |
| JP | 2021-043081 A | 3/2021 |

OTHER PUBLICATIONS

Japanese Office Action received in Japanese Application No. 2022-208369 as mailed Jan. 16, 2024, with English translation, in 10 pages.

International Search Report and Written Opinion mailed Mar. 14, 2023, International Application No. PCT/CN2022/139623, 9 pages.

* cited by examiner

DEVICE OF DETECTING RAY DOSE ADAPTABLE FOR COUPLING WITH TERMINAL AND METHOD OF DETECTING RAY DOSE

CROSS-REFERENCE TO RELATED APPLICATION

This application claims priority to Chinese Patent Application No. 202111680495.3 filed on Dec. 30, 2021 in the China National Intellectual Property Administration, the disclosure of which is incorporated herein by reference in entirety.

TECHNICAL FIELD

The present disclosure relates to a field of an environmental detection technology, and in particular, to a device of detecting a ray dose adaptable for coupling with a terminal and a method of detecting a ray dose.

BACKGROUND

With the development of society, for example, a prevention and control and a detection of a nuclear waste and a radioactive substance are becoming more and more strict, and a demand for an instrument capable of measuring and detecting the radioactive substance has increased significantly.

A commonly used device of detecting a ray includes a gas detector, a scintillator detector, a semiconductor detector and other categories. A form of the device of detecting a ray includes a wrist type (combined with a watch function), a hand-held type, a backpack type, a luggage type, etc.

Conventional devices of detecting a ray still have defects such as an inconvenience of use, a low universality, etc.

SUMMARY

In view of this, an example object of the present disclosure is to provide a device of detecting a ray dose adaptable for coupling with a terminal and a method of detecting a ray dose, so as to solve at least one of the above-mentioned technical problems.

According to an aspect of the present disclosure, a device of detecting a ray dose adaptable for coupling with a terminal is provided, including: a housing having an accommodating space and a window, wherein the accommodating space is in communication with the window; a scintillator configured to receive a ray and convert a received ray into a visible light, wherein the scintillator is located in the accommodating space, the scintillator covers the window, an outer surface of the scintillator includes a first outer surface and a second outer surface, and the first outer surface is adapted to a camera of the terminal; and a light shielding layer configured to shield a visible light in an external environment from illuminating on the scintillator, wherein the light shielding layer is arranged on the second outer surface of the scintillator, wherein the device of detecting a ray dose is mountable on the terminal, so that the scintillator and the window exactly face the camera of the terminal, so as to convert the ray in the external environment into the visible light adaptable for being received by the camera of the terminal.

According to embodiments of the present disclosure, a light reflecting layer is further arranged between the second outer surface of the scintillator and the light shielding layer, and the light reflecting layer is configured to reflect the visible light converted by the scintillator.

According to embodiments of the present disclosure, the device of detecting a ray dose adaptable for coupling with a terminal further includes a light shielding pad configured to shield the visible light in the external environment from illuminating on the scintillator, wherein the light shielding pad is arranged between the housing and the scintillator.

According to embodiments of the present disclosure, the housing and the scintillator are integrally or separately arranged.

According to embodiments of the present disclosure, the terminal includes a mobile phone, and the housing includes a mobile phone shell.

According to another aspect of the present disclosure, a method of detecting a ray dose is provided, including: triggering, in response to the device of detecting a ray dose adaptable for coupling with a terminal according to embodiments of the present disclosure converting a ray in an external environment into a visible light adaptable for being received by a camera of the terminal, a light-sensing component of the camera of the terminal; and determining a ray dose value according to light data detected by the light-sensing component.

According to embodiments of the present disclosure, the method of detecting a ray dose further includes: determining, in response to determining the ray dose value, corresponding time data, corresponding position data and corresponding angle data of the device of detecting a ray dose; determining regional ray dose data of a coverage region of each device of detecting a ray dose adaptable for coupling with a terminal according to a ray dose value detected by each device of detecting a ray dose adaptable for coupling with a terminal.

According to embodiments of the present disclosure, the regional ray dose data includes: regional ray dose intensity data of the coverage region, and regional ray dose intensity rheological data of the coverage region.

According to embodiments of the present disclosure, the method of detecting a ray dose further includes: collecting, in response to determining the ray dose value, image data by using the camera of the terminal; and determining a ray source according to the ray dose value and the image data.

According to embodiments of the present disclosure, the method of detecting a ray dose further includes: comparing the ray dose value with a detection threshold value to determine an abnormal ray dose value; and re-evaluating the abnormal ray dose value.

According to embodiments of the disclosure, the method of detecting a ray dose further includes: calibrating a ray dose value of an environmental background.

DETAILED DESCRIPTION OF EMBODIMENTS

In order to make objectives, technical solutions and advantages of the present disclosure clearer, the present disclosure will be further described in detail below with reference to specific embodiments and the accompanying drawings. The following description of embodiments of the present disclosure with reference to the accompanying drawings is intended to explain the general inventive concept of the present disclosure, and should not be construed as limiting the present disclosure.

Figure 1:
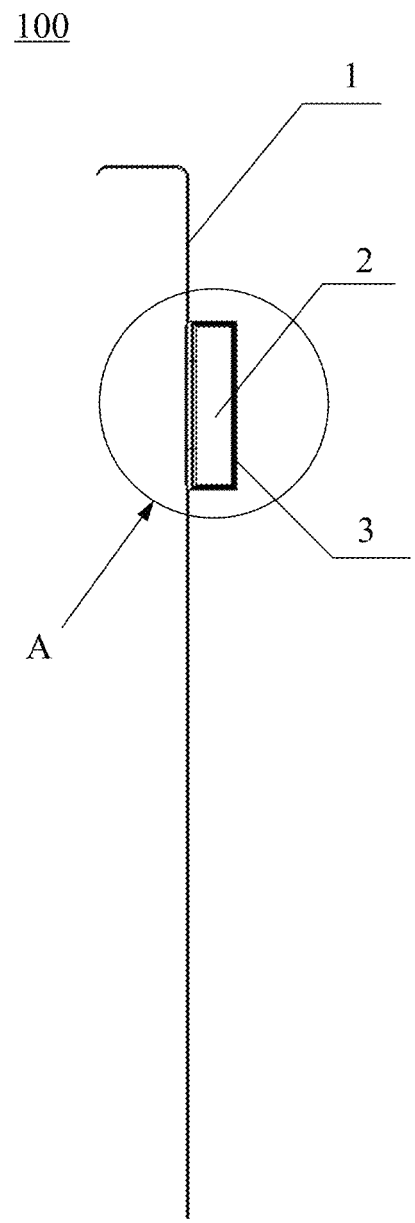
FIG. 1 schematically shows a structural diagram of a device of detecting a ray dose adaptable for coupling with a terminal according to an embodiment of the present disclosure.
Figure 2:
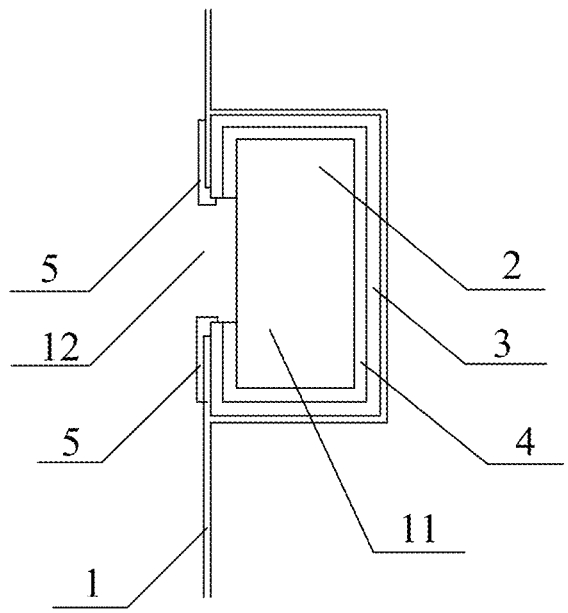
FIG. 2 schematically shows an enlarged view of a structure at position A in the device of detecting a ray dose adaptable for coupling with a terminal shown in FIG. 1 according to an embodiment of the present disclosure.

FIG. 1 schematically shows a structural diagram of a device of detecting a ray dose adaptable for coupling with a terminal according to an embodiment of the present disclosure, and FIG. 2 schematically shows an enlarged view of a structure at position A in FIG. 1.

As shown in FIG. 1, a device 100 of detecting a ray dose adaptable for coupling with a terminal according to embodiments of the present disclosure includes: a housing 1, a scintillator 2 and a light shielding layer 3. As shown in FIG. 2, the housing 1 has an accommodating space 11 and a window 12, and the accommodating space 11 is in communication with the window 12. The scintillator 2 is used to receive a ray and convert a received ray into a visible light. The scintillator 2 is located in the accommodating space 11, the scintillator 2 covers the window 12, an outer surface of the scintillator 2 includes a first outer surface and a second outer surface, and the first outer surface is adapted to a camera of the terminal. The light shielding layer 3 is used to shield a visible light in an external environment from illuminating on the scintillator 2. The light shielding layer 3 is arranged on the second outer surface of the scintillator 2. The device 100 of detecting a ray dose is mountable on the terminal, so that the scintillator 2 and the window 12 exactly face the camera of the terminal, so as to convert the ray in the external environment into the visible light adaptable for being received by the camera of the terminal.

When the device 100 of detecting a ray dose adaptable for coupling with a terminal (hereinafter referred to as the device of detecting a ray dose for the sake of brevity and clarity) according to embodiments of the present disclosure is used, a housing 1 of the device 100 of detecting a ray dose may be sleeved on the terminal, so that the device 100 of detecting a ray dose is in communication with the terminal. The camera of the terminal exactly faces the window 12 of the device 100 of detecting a ray dose. When radioactive substances such as X-ray, y-ray, etc. exist in the external environment, a ray of the radioactive substances may act with the scintillator 2, so that the ray in the external environment may be converted into the visible light adaptable for being received by the camera of the terminal. At the same time, natural light in the external environment may be shielded by the light shielding layer 3, that is, only the rays in the external environment may act with the scintillator 2. The scintillator 2 and the window 12 exactly face the camera of the terminal, and the visible light converted by the scintillator 2 may be received by the camera. Specifically, the visible light converted by the scintillator 2 may be detected by a light-sensing component of the camera. A value of a parameter, such as a ray dose, etc., of the external environment may be determined according to light data, such as a luminous flux, etc., of the visible light detected by the light-sensing component, and the value of the parameter, such as a ray dose, etc., of the external environment may be quantized to obtain a ray dose value.

For example, the principle that the scintillator 2 in embodiments of the present disclosure may convert the ray in the external environment into the visible light may be: under an impact of high-energy particles of a ray (the ray is non-visible light), the scintillator 2 may convert a kinetic energy of the high-energy particles into a light energy and emit the visible light.

Exemplarily, when the ray in the external environment includes X-ray and y-ray, the scintillator 2 may include, for example, a scintillation crystal sensitive to the X-ray and the g-ray, a transparent or translucent ceramic material, and a powder intensifying screen material. For example, the scintillator 2 may include a NaI (sodium iodide) crystal.

Exemplarily, the scintillator 2 may also be adaptively preprocessed. For example, the NaI crystal has a characteristic of easy deliquesce, which may be adaptively preprocessed for a moisture removal and sealed packaging. The moisture removal and sealed packaging is an adaptive preprocessing.

Exemplarily, the light shielding layer 3 is made of an aluminum film or a black paint material.

The device 100 of detecting a ray dose adaptable for coupling with a terminal according to embodiments of the present disclosure has at least one of the following advantages:

(1) The device 100 of detecting a ray dose may be connected with the terminal by providing the housing 1, so that a structural coupling between the device 100 of detecting a ray dose and the terminal may be realized, which may facilitate a carrying. The ray dose in the external environment may be detected while using the terminal, which may be more convenient to use.

(2) The ray of the radioactive substances in the external environment may be converted into the visible light through the scintillator 2 by providing the scintillator 2 located in the accommodating space 11 and the window 12 exactly facing the camera of the terminal, and the visible light may act with the camera of the terminal through the window 12 to determine the ray dose. The terminal including the camera is reasonably and ingeniously coupled with the device 100 of detecting a ray dose, and both of them jointly implement a ray dose detection.

(3) The scintillator 2 may only convert the ray of the external environment into the visible light by providing the light shielding layer 3 located on a second surface of the scintillator 2, so as to avoid determining the ray dose value by using the visible light of the external environment, which may cause an error in the ray dose detection.

It should be noted that the ray dose in the external environment may be detected after the device 100 of detecting a ray dose adaptable for coupling with a terminal according to embodiments of the present disclosure is connected with the terminal. Since the scintillator 2 covers the window 12 exactly facing the camera, and the second outer surface of the scintillator 2 is also provided with a light shielding layer, the camera may not be normally used to take photos or perform other operations when the terminal is connected with the device 100 of detecting a ray dose, and the camera may be used normally after the device 100 of detecting a ray dose is removed.

It should also be noted that the scintillator 2 is a three-dimensional structure, such as, a cuboid, a cube, etc. The outer surface of the scintillator 2 refers to an outer surface of the three-dimensional structure. Except for the first outer surface adapted to the camera of the terminal, the rest of surfaces are second outer surfaces. An adaptation of the first outer surface to the camera of the terminal may be understood as that the first outer surface and the camera of the terminal have the same area and the same outer contour when the first outer surface exactly faces the camera of the terminal.

Exemplarily, as shown in FIG. 2, a light reflecting layer 4 may also be provided between the second outer surface of the scintillator 2 and the light shielding layer 3. The light reflecting layer 4 may be used to reflect the visible light converted by the scintillator 2, so that photons generated by the scintillator 2 may be output to the camera of the terminal through the window 12 as much as possible.

The device 100 of detecting a ray dose according to embodiments of the present disclosure determines the ray dose by converting the ray in the external environment into the visible light through the scintillator 2. The external environment includes not only the ray of the radioactive substances, but also the visible light, such as sunlight, light, etc. The visible light may be received by the camera of the terminal through the scintillator 2, which may interfere with the ray dose detection. Therefore, in an ideal state, the visible light in the external environment is completely blocked, and the visible light in the external environment may not be received by the camera of the terminal through the scintillator 2. In the above-mentioned embodiments, the visible light in the external environment may be blocked by providing a light shielding layer 3 on the second outer surface of the scintillator 2. In order to better block the visible light in the external environment, in embodiments of the present disclosure, the light reflecting layer 4 is also arranged between the second outer surface of the scintillator 2 and the light shielding layer 3. The light reflecting layer 4 may be used to reflect the visible light converted by the scintillator 2, so that the visible light converted by the scintillator 2 may not be absorbed by the light shielding layer 3, and the visible light converted by the scintillator 2 may be output to the camera of the terminal through the window 12, which may increase a measurement sensitivity and improve an effect of shielding the visible light in the external environment, so as to improve an accuracy of the ray dose detection of the device 100 of detecting a ray dose.

Exemplarily, as shown in FIG. 2, the device 100 of detecting a ray dose adaptable for coupling with a terminal may also include a light shielding pad 5 for shielding the visible light in the external environment from illuminating on the scintillator 2, and the light shielding pad 5 may be arranged between the housing 1 and the scintillator 2.

The device of detecting a ray dose according to embodiments of the present disclosure may further improve the effect of shielding the visible light in the external environment by providing the light shielding pad 5, so as to improve the accuracy of the ray dose detection of the device 100 of detecting a ray dose.

Exemplarily, as shown in FIG. 2, the light shielding pad 5 may be arranged between the housing 1 and the scintillator 2, and extends to an edge of the window 12.

In the device 100 of detecting a ray dose according to embodiments of the present disclosure, the housing 1 and the scintillator 2 may be integrally or separately arranged.

The device 100 of detecting a ray dose according to embodiments of the present disclosure may make the use of the device 100 of detecting a ray dose more flexible and adapt to different application scenarios through the housing 1 and the scintillator 2 that are integrally arranged or the housing 1 and the scintillator 2 that are separately arranged.

Exemplarily, the terminal may include a mobile phone, and the housing may include a mobile phone shell. At present, the mobile phone is used more frequently by the public, and the mobile phone is also easy to carry. The device 100 of detecting a ray dose coupled with the mobile phone may be more convenient and may meet daily ray dose detection requirements of the public. Certainly, the terminal may also include a device such as a flat panel, etc., which will not be specifically limited. The terminal equipped with the camera may be coupled with the device 100 of detecting a ray dose according to embodiments of the present disclosure, so as to detect the ray dose.

According to another aspect of embodiments of the present disclosure, a method of detecting a ray dose is further provided.

Figure 3:
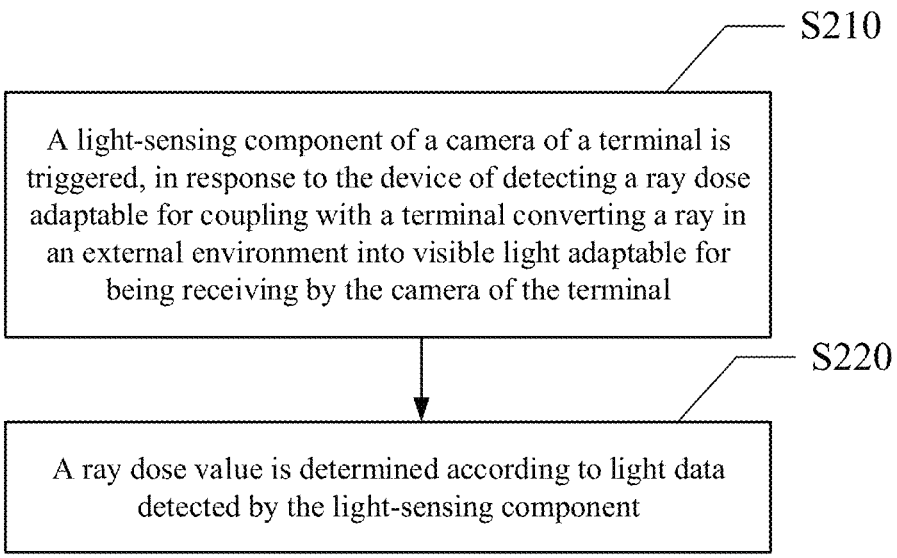
FIG. 3 schematically shows a flowchart of a method of detecting a ray dose according to an embodiment of the present disclosure.

As shown in FIG. 3, a method 200 of detecting a ray dose according to embodiments of the present disclosure includes operations S210 to S220.

In operation S210, in response to the device of detecting a ray dose adaptable for coupling with a terminal converting a ray in an external environment into visible light adaptable for being receiving by a camera of the terminal, a light-sensing component of the camera of the terminal is triggered.

In operation S220, a ray dose value is determined according to light data detected by the light-sensing component.

The method 200 of detecting a ray dose according to embodiments of the present disclosure may use the camera and the light-sensing component configured by the terminal itself as components for detecting the ray dose. After the device of detecting a ray dose according to embodiments of the present disclosure is coupled with the terminal, the ray dose detection may be performed conveniently.

Exemplarily, a value of the light data may be determined by using the light-sensing component of the camera and then converted, so as to determine the ray dose value.

It should be noted that the camera itself is equipped with the light-sensing component. The light-sensing component may include, for example, a CCD (Charge-coupled Device), a charge-coupled element. A light-sensitive element may be used to detect the light data.

Exemplarily, the light data of the method of detecting a ray dose according to embodiments of the present disclosure may include, for example, a luminous flux, that is, a value of the luminous flux is used as a basis for determining the ray dose value, but the light data is not limited to the parameter of luminous flux. For example, a value of a parameter of light intensity may also be used as the basis for determining the ray dose value. The luminous flux refers to a radiation power that may be felt by the human eye, and the value of the luminous flux is equal to a product of a ray radiation of a band in unit time and a relative visibility of the band.

Exemplarily, the light data may be acquired by using a software on a terminal device and the ray dose value, etc. may be displayed.

Figure 4:
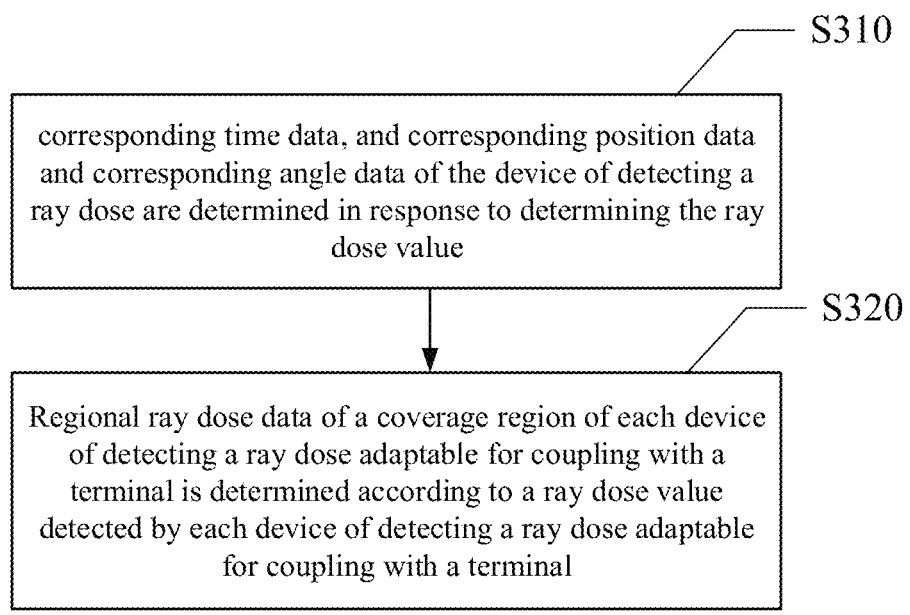
FIG. 4 schematically shows a flowchart of a method of detecting a ray dose according to another embodiment of the present disclosure.

As shown in FIG. 4, a method 300 of detecting a ray dose according to another embodiment of the present disclosure may also include operations S310 to S320.

In operation S310, in response to determining the ray dose value, corresponding time data, corresponding position data and corresponding angle data of the device of detecting a ray dose are determined.

Exemplarily, time data corresponding to the ray dose value may be determined by a time axis. Position data corresponding to the ray dose value may be determined by a positioning device configured by the terminal itself, and angle data corresponding to the ray dose value may also be determined by a gyroscope and other devices configured by the terminal itself.

In operation S320, regional ray dose data of a coverage region of each device of detecting a ray dose adaptable for coupling with a terminal is determined according to the ray dose value detected by each device of detecting a ray dose adaptable for coupling with a terminal.

The method of detecting a ray dose according to embodiments of the present disclosure may associate the ray dose value with a corresponding time, position and angle. After a plurality of terminals are provided, and each terminal is coupled with the device of detecting a ray dose according to embodiments of the present disclosure, the ray dose value detected by each device of detecting a ray dose may be integrated and processed to achieve a regionalized and grid ray dose detection.

In the method of detecting a ray dose according to embodiments of the present disclosure, for example, a region where each device of detecting a ray dose is included may be determined as the coverage region based on a position where each device of detecting a ray dose is located. Exemplarily, an average value of ray dose values detected by each device of detecting a ray dose at a certain time in the coverage region may be used as the regional ray dose data of the coverage region at the time.

Exemplarily, the regional ray dose data may include: regional ray dose intensity data of the coverage region, and regional ray dose intensity rheological data of the coverage region.

Exemplarily, the average value of the ray dose values detected by each device of detecting a ray dose in the coverage region may be used as the regional ray dose intensity data of the coverage region, or a numerical segmentation may be pre-performed on the regional ray dose data, and the regional ray dose intensity of each numerical segment may be set. Subsequently, the regional ray dose intensity data of the coverage region may be determined by the numerical segment to which the average value of the ray dose values detected by each device of detecting a ray dose in a certain coverage region belongs.

The regional ray dose intensity rheological data of the coverage region may be used to represent regional ray dose intensity data of a certain coverage region that changes over time. It should be understood that a value of data representing time is continuous. In order to efficiently determine the regional ray dose intensity rheological data of the coverage region, for example, a certain time period may be used as a unit of a change of the regional ray dose intensity data of the coverage region. For example, 10 minutes may be set as the unit of the change of the regional ray dose intensity data of the coverage region.

The method of detecting a ray dose according to embodiments of the present disclosure may process the regional ray dose data of the coverage region from a plurality of aspects, and comprehensively evaluate parameters related to the radioactive substances in the coverage region. For example, the parameters of the regional ray dose intensity data of the coverage region and the regional ray dose intensity rheological data of the coverage region may be used to evaluate a hazard level of the radioactive substances in the coverage region and a change in the hazard level of the radioactive substances.

Figure 5:
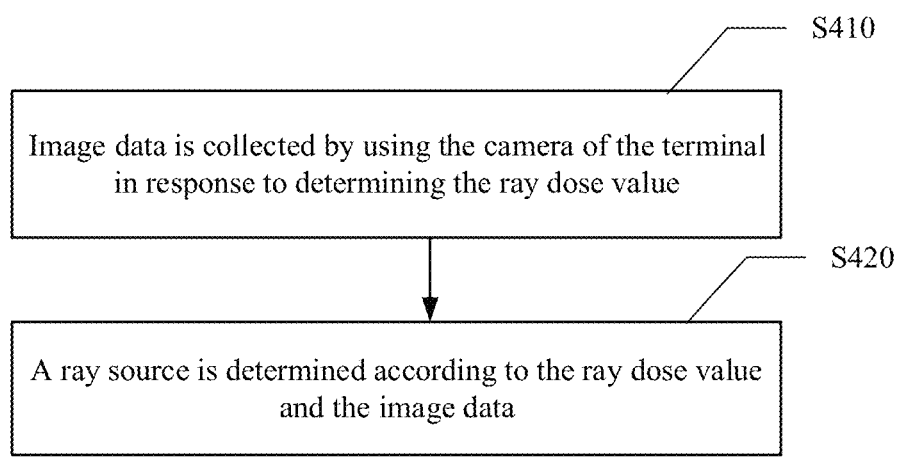
FIG. 5 schematically shows a flowchart of a method of detecting a ray dose according to another embodiment of the present disclosure.

As shown in FIG. 5, a method 400 of detecting a ray dose according to another embodiment of the present disclosure may also include: operations S410 to S420.

In operation S410, in response to determining the ray dose value, image data is collected by using the camera of the terminal.

In operation S420, a ray source is determined according to the ray dose value and the image data.

It should be noted that when the ray dose value of the current environment is detected by using the device of detecting a ray dose according to embodiments of the present disclosure, the camera is covered by the scintillator, and the second outer surface of the scintillator is provided with the light shielding layer, the light reflecting layer and other structures. Therefore, when the device of detecting a ray dose detects the ray dose value of the current environment, the same camera of the terminal may not be used to simultaneously collect the image data and convert the visible light of the external environment.

In the method of detecting a ray dose according to embodiments of the present disclosure, operation S410 of collecting, in response to determining the ray dose value, image data by using the camera of the terminal may be understood as removing the device of detecting a ray dose coupled with the terminal after determining the ray dose value, and when the image data is collected by using the camera of the terminal or the terminal includes a plurality of cameras, the image data is collected by using another camera.

The method of detecting a ray dose according to embodiments of the present disclosure may collect the image data by using the camera of the terminal, so as to determine the ray source, that is, the ray source may be traced. Subsequently, for example, a user who uses the device of detecting a ray dose may be prompted for a position of the ray source, and the user may make a decision, such as being far away from the ray source, etc., to improve a user experience.

Figure 6:
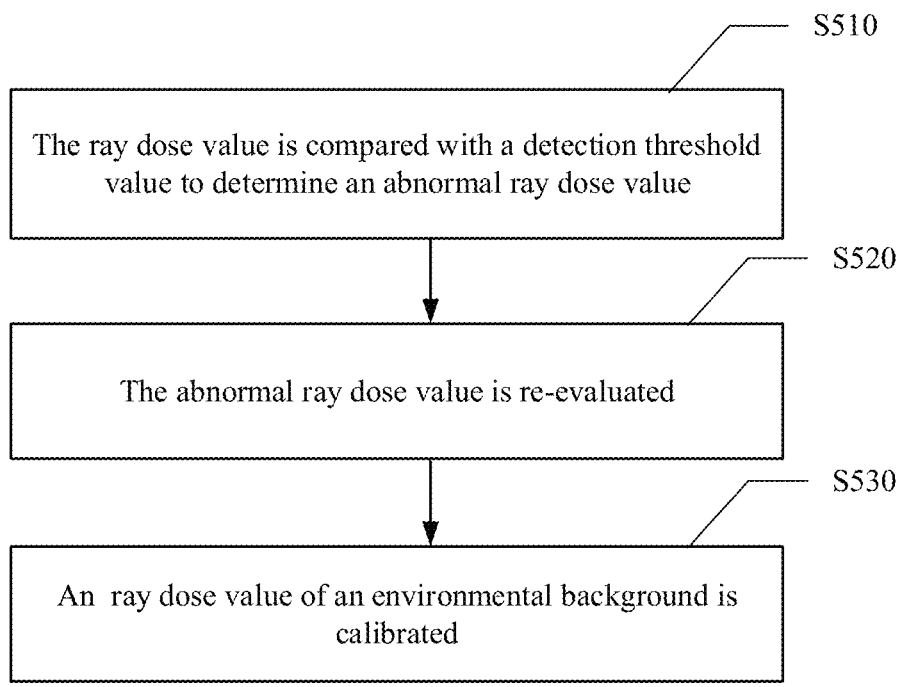
FIG. 6 schematically shows a flowchart of a method of detecting a ray dose according to another embodiment of the present disclosure.

As shown in FIG. 6, a method 500 of detecting a ray dose according to another embodiment of the present disclosure may also include: operations S510 to S520.

In operation S510, the ray dose value is compared with a detection threshold value to determine an abnormal ray dose value.

In operation S520, the abnormal ray dose value is re-evaluated.

Exemplarily, the detection threshold value may be preset.

Exemplarily, the ray dose value may be compared with the detection threshold value to determine the ray dose value exceeding the detection threshold value as the abnormal ray dose value.

It should be noted that since the method of detecting a ray dose according to embodiments of the present disclosure performs the detection based on the device of detecting a ray dose according to embodiments of the present disclosure, the device of detecting a ray dose needs to block external visible light to ensure an accuracy of the detection. For example, when the visible light in the external environment may penetrate the device of detecting a ray dose for some reasons, a detected ray dose value may greatly increase, resulting in an error in the ray dose detection. Exemplarily, the method of detecting a ray dose according to embodiments of the present disclosure may also include: transmitting a prompt signal, in response to the ray dose value exceeding a reasonable threshold value.

The reasonable threshold value here may be understood as that when the visible light in the external environment may penetrate the device of detecting a ray dose for some reasons, for example, the value of the light data that may be detected by the light-sensing component of the camera of the terminal greatly increases and exceeds a reasonable range, such as an exposure, etc. At this time, a prompt signal may be sent to indicate that some cases, such as not blocking natural light in the external environment, etc., may exist.

The method of detecting a ray dose according to embodiments of the present disclosure may reduce an error rate of the ray dose detection and improve an accuracy of the ray dose detection by re-evaluating the abnormal ray dose value.

Exemplarily, as shown in FIG. 6, the method 500 of detecting a ray dose according to embodiments of the present disclosure may also include: operation S530.

In operation of S530, a ray dose value of an environmental background is calibrated.

It should be noted that in a fixed region, a change in a ray dose of an environmental background is relatively constant, which may be slightly affected by weather, season, temperature difference, etc., and thus may be regarded as a constant. Anew device of detecting a ray dose enters the region for the first time, or after a long time of use, an internal parameter setting of the new device of detecting a ray dose is not necessarily reasonable or deviates, so the ray dose value of the environmental background is required to be calibrated.

The method of detecting a ray dose according to embodiments of the present disclosure may improve the accuracy of the ray dose detection by calibrating the ray dose value of the environmental background.

It should be noted that the method of detecting a ray dose according to embodiments of the present disclosure may be realized by a software (hereinafter referred to as a ray dose detection software). Specifically, the ray dose detection software may be installed to the terminal coupled with the device of detecting a ray dose. The detected ray dose value, regional ray dose data and other data may be provided to the user through the ray dose detection software. The ray dose detection software may interact with a data center and accordingly store data.

For example, the method of detecting a ray dose according to embodiments of the present disclosure may also transmit an early warning signal in response to the abnormal ray dose value. Specifically, the warning signal may be sent to the ray dose detection software or the data center.

The method of detecting a ray dose according to embodiments of the present disclosure will be described by taking the mobile phone as the terminal.

Exemplarily, a status of the mobile phone may be determined by the position data and the angle data of the device of detecting a ray dose. For example, when the mobile phone is in a moving and rotating state, the ray dose detection software may backtrack the ray dose value, and find an extreme value of an envelope of the ray dose value in a time dimension, so as to determine an obvious numerical data bulge and a jumped ray dose value as the abnormal ray dose values (corresponding to comparing the ray dose value with the detection threshold value to determine the abnormal ray dose value). A physical position of the abnormal ray dose value may also be determined according to the position data, the angle data, the time data and other information of the abnormal ray dose value in combination with the image data collected by the camera, so that articles and personnel that may carry the radioactive substances may be found out (corresponding to determining the ray source), and the abnormal ray dose value may be uploaded to the data center.

For example, when the mobile phone is in a static state, another camera may be used. The ray dose detection software may automatically record an image of an object passing in front of the mobile phone, and associate the image of the object with the ray detection value. Subsequently, the ray dose value may be traced back, and the extreme value of the envelope of the ray dose value may be found in the time dimension, so as to determine the obvious numerical data bulge and the jumped ray dose value as the abnormal ray dose values (corresponding to comparing the ray dose value with the detection threshold value to determine the abnormal ray dose value), and the abnormal ray dose value may also be uploaded to the data center; if no abnormal ray dose value exists, an image information previously recorded may be deleted, and only the ray dose value, the corresponding time data, the corresponding position data, etc. may be retained The above-mentioned specific embodiments have described in detail the objectives, technical solutions and advantages of the present disclosure. It should be noted that the above are only specific embodiments of the present disclosure and are not intended to limit the present disclosure. Any modifications, equivalent substitutions, improvements, and the like made within the spirit and scope of the present disclosure shall be included in the scope of protection of the present disclosure.

What is claimed is:

1. A device of detecting a ray dose adaptable for coupling with a terminal, comprising:
    a housing having an accommodating space and a window, wherein the accommodating space is in communication with the window;
    a scintillator configured to receive a ray and convert a received ray into a visible light, wherein the scintillator is located in the accommodating space, the scintillator covers the window, an outer surface of the scintillator comprises a first outer surface and a second outer surface, and the first outer surface is adapted to a camera of the terminal; and
    a light shielding layer configured to shield a visible light in an external environment from illuminating on the scintillator, wherein the light shielding layer is arranged on the second outer surface of the scintillator,
    wherein the device of detecting a ray dose is mountable on the terminal, so that the scintillator and the window exactly face the camera of the terminal, so as to convert the ray in the external environment into the visible light adaptable for being received by the camera of the terminal,
    wherein the device further comprises a light shielding pad configured to shield the visible light in the external environment from illuminating on the scintillator, and wherein the light shielding pad is arranged between the housing and the scintillator.

2. The device according to claim 1, wherein a light reflecting layer is further arranged between the second outer surface of the scintillator and the light shielding layer, and the light reflecting layer is configured to reflect the visible light converted by the scintillator.

3. The device according to claim 1, wherein the housing and the scintillator are integrally arranged.

4. The device according to claim 1, wherein the housing and the scintillator are separately arranged.

5. The device according to claim 1, wherein the terminal comprises a mobile phone, and the housing comprises a mobile phone shell.

6. A method of detecting a ray dose, comprising:
triggering, in response to the device of detecting a ray dose adaptable for coupling with a terminal according to claim 1 converting a ray in an external environment into a visible light adaptable for being received by a camera of the terminal, a light-sensing component of the camera of the terminal; and
determining a ray dose value according to light data detected by the light-sensing component.

7. The method according to claim 6, further comprising:
determining, in response to determining the ray dose value, corresponding time data, and corresponding position data and corresponding angle data of the device of detecting a ray dose;
determining regional ray dose data of a coverage region of each device of detecting a ray dose adaptable for coupling with a terminal, according to a ray dose value detected by each device of detecting a ray dose adaptable for coupling with a terminal.

8. The method according to claim 7, wherein the regional ray dose data comprises:
regional ray dose intensity data of the coverage region, and regional ray dose intensity rheological data of the coverage region.

9. The method according to claim 6, further comprising:
collecting, in response to determining the ray dose value, image data by using the camera of the terminal; and
determining a ray source according to the ray dose value and the image data.

10. The method according to claim 6, further comprising:
comparing the ray dose value with a detection threshold value to determine an abnormal ray dose value; and
re-evaluating the abnormal ray dose value.

11. The method according to claim 6, further comprising:
calibrating a ray dose value of an environmental background.

* * * * *